United States Patent Office 3,439,092
Patented Apr. 15, 1969

3,439,092
CONTROL OF FUNGI WITH O,O-DIETHYL-S-TRICHLOROMETHYLPHOSPHORODITHIOATE
Ralph B. Fearing, Hammond, Ind., and Malcolm B. McClelland, San Jose, Calif., assignors to Stauffer Chemical Company, New York, N.Y., a corporation of Delaware
No Drawing. Original application Oct. 7, 1964, Ser. No. 402,327, now Patent No. 3,391,230, dated July 2, 1968. Divided and this application Feb. 14, 1968, Ser. No. 724,307
Int. Cl. A01n 9/36
U.S. Cl. 424—225    1 Claim

ABSTRACT OF THE DISCLOSURE

This invention concerns the control of fungi with O,O-diethyl-S-trichloromethylphosphorodithioate.

---

This application is a division of copending application Ser. No. 402,327, filed Oct. 7, 1964, and now U.S. Patent 3,391,230, granted July 2, 1968.

This invention relates to a new phosphorodithioate, its method of preparation and use as a fungicide. More specifically, the new compound is O,O-diethyl-S-trichloromethylphosphorodithioate [$(C_2H_5O)_2P(S)SCCl_3$]. This new compound has been found to be generally active against fungi such as *Fusarium solani*, *Aspergillus niger* and *Escherichia coli*, but is especially active against *Penicillium sp.*

The novel compound is prepared according to the following reaction:

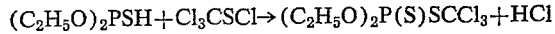

Reaction is preferably carried out in the presence of an organic solvent such as benzene, dioxane, toulene or the like, and in the presence of a hydrogen halide acceptor such as triethylamine, pyridine, or picoline. Reaction temperatures need not be critically controlled, but are normally maintained between 0 and 100° C.

Example

To a solution of 93 grams of trichloromethyl sulfenyl chloride (0.5 mol.) in 400 cc. of benzene contained in a reactor flask fitted with a thermometer and stirrer, was added dropwise by separate dropping funnels 77 grams of diethyl thiophosphite (0.5 mol) and 50.5 grams of triethylamine (0.5 mol.), while maintaining the temperature at 15° C. The mixture was allowed to come to room temperature and after 1 hour was washed three times with small portions of water containing ice to maintain the temperature at 0° C. Hexane (100 cc. to aid separation) and 2 pinches of powdered $CaCl_2$ (to absorb suspended water) were added. The organic portion was then dried overnight with granulated $CaCl_2$. The solvent was removed by simple distillation and the product was fractionally distilled in a Vigreux column to yield 16.9 grams of O,O-diethyl-S-trichloromethylphosphorodithioate having an average index of refraction of $N_D^{25}-1.5304$, and analysis of 22.3% S, and 36.8% Cl as compared to theoretically predicted 21.1% S, and 35.2% Cl.

In order to evaluate the novel fungicide of the invention, in vitro and soil incorporation tests were run. In the in vitro screening test, the sample compound was placed in a vial of malt broth and in a vial of nutrient broth to give a concentration of 50 p.p.m. of the sample compound. Water suspension of spores of *Aspergillus niger*, *Penicillium sp.*, and *Escherichia coli* were added (one organism per vial). One week later, results were read and no growth was observed; an in vitro evaluation test was then run. In the in vitro evaluation test the same method employed in the in vitro screening test was used except that the solution was diluted down to 5 p.p.m.

In the soil incorporation test, the sample compound was pipetted into soil infested with *Fusarium solani* at a rate of 110 p.p.m. The treated soil was then mixed and dumped into a paper container. Beans were planted in the *Fusarium solani*-infested and treated soil, and three to four weeks later, the plants were inspected for disease symptoms.

Results of the foregoing test are set forth in the following table.

Table.—Fungicidal activity

| Test and species: | Control,[1] (p.p.m.) |
|---|---|
| In vitro evaluation: | |
| *Aspergillus niger* | 50%/5 |
| *Penicillium sp* | 100%/5 |
| *Escherichia coli* | 100%/>50 |
| Soil incorporation test: | |
| *Fusarium solani* | 50%/50 |

[1] Percent control of fungi growth (in vitro) or activity (soil incorporation test) per concentration of active compound in test solution.

Having thus described the invention, what is claimed is:
1. A method of controlling fungi which comprises contacting the fungi with a fungicidal amount of O,O-diethyl-S-trichloromethylphosphorodithioate.

References Cited

UNITED STATES PATENTS

| 2,811,543 | 10/1957 | Coover et al. | 260—963 |
| 3,020,304 | 2/1962 | Scherer et al. | 260—963 |
| 3,270,095 | 8/1966 | Malz et al. | 260—963 |

ALBERT T. MEYERS, *Primary Examiner.*

S. J. FRIEDMAN, *Assistant Examiner.*